US008307961B2

(12) United States Patent
Emilsson

(10) Patent No.: US 8,307,961 B2
(45) Date of Patent: Nov. 13, 2012

(54) RAIL VEHICLE BRAKE SLACK ADJUSTER

(75) Inventor: Fred Emilsson, Trelleborg (SE)

(73) Assignee: Faiveley Transport Nordic AB, Landskrona (SE)

( * ) Notice: Subject to any disclaimer, the term of this patent is extended or adjusted under 35 U.S.C. 154(b) by 351 days.

(21) Appl. No.: 12/526,337

(22) PCT Filed: Feb. 7, 2008

(86) PCT No.: PCT/SE2008/050150
§ 371 (c)(1),
(2), (4) Date: Aug. 31, 2010

(87) PCT Pub. No.: WO2008/097188
PCT Pub. Date: Aug. 14, 2008

(65) Prior Publication Data

US 2010/0320044 A1 Dec. 23, 2010

(30) Foreign Application Priority Data

Feb. 7, 2007 (SE) ...................................... 0700290

(51) Int. Cl.
*F16D 65/14* (2006.01)
(52) U.S. Cl. ..................... 188/196 D; 188/202; 188/203
(58) Field of Classification Search .............. 188/196 D, 188/202, 203
See application file for complete search history.

(56) References Cited

U.S. PATENT DOCUMENTS 3,100,032 A * 8/1963 Larsson .................... 188/196 D
3,744,596 A 7/1973 Sander
4,036,332 A 7/1977 Sander
4,138,002 A * 2/1979 Sander et al. ............. 188/196 D
4,441,591 A * 4/1984 Severinsson et al. ......... 188/202
4,585,097 A * 4/1986 Severinsson .................. 188/199
4,635,762 A * 1/1987 Nilsson et al. ................ 188/203
4,676,346 A * 6/1987 Barberis ....................... 188/202
4,833,975 A * 5/1989 Rocholl et al. .................... 92/63

FOREIGN PATENT DOCUMENTS

DE 2 316 822 10/1974
DE 28 30 361 1/1980
EP 0 165 647 12/1985
EP 0 174 690 3/1986
GB 1 420 724 4/1974
WO WO 79/00557 8/1979

* cited by examiner

*Primary Examiner* — Christopher Schwartz
(74) *Attorney, Agent, or Firm* — Merchant & Gould P.C.

(57) ABSTRACT

A rail vehicle brake slack adjuster comprises an axially movable, sleeve-shaped driver element (22) adapted to receive an axially applied braking force in a brake application direction, a spindle (16) axially movable within the driver element, an adjuster nut (34) in non-self-locking thread engagement with the spindle, clutch means between the driver element and the adjuster nut, and a barrel spring (30) biasing the spindle in the brake application direction. The adjuster has a combination of a first clutch (36) comprising a clutch surface on the driver element (22) directed in the brake application direction and a corresponding clutch surface on the adjuster nut (34) and a second clutch (38) comprising a clutch surface on the driver element (22) directed in the direction opposite to the brake application direction and a corresponding clutch surface on an adjuster nut sleeve (37). The adjuster nut sleeve (37) is axially movable on the adjuster nut (34).

8 Claims, 3 Drawing Sheets

RAIL VEHICLE BRAKE SLACK ADJUSTER

This application is a National Stage Application of PCT/SE2008/050150, filed 7 Feb. 2008, which claims benefit of Serial No. 0700290-0, filed 17 Feb. 2007, in Germany and which applications are incorporated herein by reference. To the extent appropriate, a claim of priority is made to each of the above disclosed applications.

TECHNICAL FIELD

The present invention relates to a rail vehicle brake slack adjuster, comprising an axially movable, sleeve-shaped driver element adapted to receive an axially applied braking force in a brake application direction, a spindle axially movable within the driver element, an adjuster nut in non-self-locking thread engagement with the spindle, clutch means between the driver element and the adjuster nut, and a barrel spring biasing the spindle in the brake application direction.

BACKGROUND OF THE INVENTION

Rail vehicle slack adjusters may be divided into two main groups having one or two nuts, respectively, in non-self-locking engagement with the spindle in order to perform the function of adjusting the slack between a brake block or pad and a tread of a wheel or a brake disc to a an intended value.

The present invention relates to an adjuster of the one-nut-type.

There are numerous examples of such adjusters, typical examples being disclosed by EP-A-0 165 641, DE-A-23 16 822, EP-A-0 174 690, U.S. Pat. No. 4,036,332, and DE-A-28 30 361 (without any specific order).

A basic example of a one-nut-adjuster built-into a so called brake unit with considerable commercial success is shown in U.S. Pat. No. 3,744,596. This adjuster, however, has certain drawbacks, of which the most important one is that it contains a powerful spring needed for its adjusting function and creating a considerable counter-force at brake application. Also, its spindle and nut is combined into one unit creating an unnecessarily great rotating mass.

Another one-nut-adjuster without these drawbacks is shown in U.S. Pat. No. 4,138,002, which is regarded as the closest prior art. However, this prior adjuster has other drawbacks, such that a compression spring therein causes a counter-force (which, however, is smaller than in U.S. Pat. No. 3,744,596) at brake application and that the provision of two internal clutch surfaces in the member corresponding to the driver element causes great manufacturing difficulties with accompanying greater expenses.

THE INVENTION

These and other drawbacks and problems are according to the invention obviated by the combination of a first clutch comprising a clutch surface on the driver element directed in the brake application direction and a corresponding clutch surface on the adjuster nut and a second clutch comprising a clutch surface on the driver element directed in the direction opposite to the brake application direction and a corresponding clutch surface on an adjuster nut sleeve, the adjuster nut sleeve a) being axially movable on the adjuster nut, b) being biased in the brake application direction by a leader spring, c) having an end position in the brake application direction in relation to the adjuster nut such that the minimum axial distance between the clutch surfaces on the adjuster nut and the adjuster nut sleeve exceeds the axial distance between the two clutch surfaces on the driver element, and d) defining a control distance or "A"-measure with a control sleeve, which is axially fixed in relation to the driver sleeve and the adjuster nut.

The thus created slack adjuster is double-acting, i e it has the ability to decrease a slack that has become too large due for example to wear of the brake block in the brake rigging and to increase a slack that has become too small. Besides obviating the mentioned problems with counter-forces in the prior adjusters, the adjuster according to the invention has as the only rotating members the adjuster nut with its adjuster sleeve, which have a minimal mass and provides for a very fast slack adjusting action.

In the slack adjuster according to the invention, the leader spring may bear against the adjuster nut sleeve via a ball bearing, which defines the control distance or "A"-measure with an internal locking ring in the control sleeve.

Preferably, an axially movable driver element sleeve, attached to the driver element, is slidingly guided by a housing for the slack adjuster and an axially movable barrel spring sleeve, connected to a push member at the end of the spindle, is slidingly guided by the driver element sleeve, the barrel spring being arranged within these two sleeves.

A guiding sleeve for the spindle may be attached to the driver element, and a ball bearing may be arranged between the guiding sleeve and the adjuster nut.

The two clutches are preferably serrated in order to safeguard a dependable engagement.

In a special embodiment, the barrel spring may be arranged outside a slack adjuster housing around the spindle between a push member at the end of the spindle and a sealing sleeve forming a part of the housing for the slack adjuster.

The slack adjuster according to the invention preferably forms part of and is built-into a brake unit, in which the driver element is transferred in the brake application direction by a piston. It may, however, quite as well be designed as a separate axial slack adjuster, as is well known in the art.

BRIEF DESCRIPTION OF THE DRAWINGS

The invention will be described in further detail below under reference to the accompanying drawings, in which.

DETAILED DESCRIPTION OF EMBODIMENTS

Figure 1:
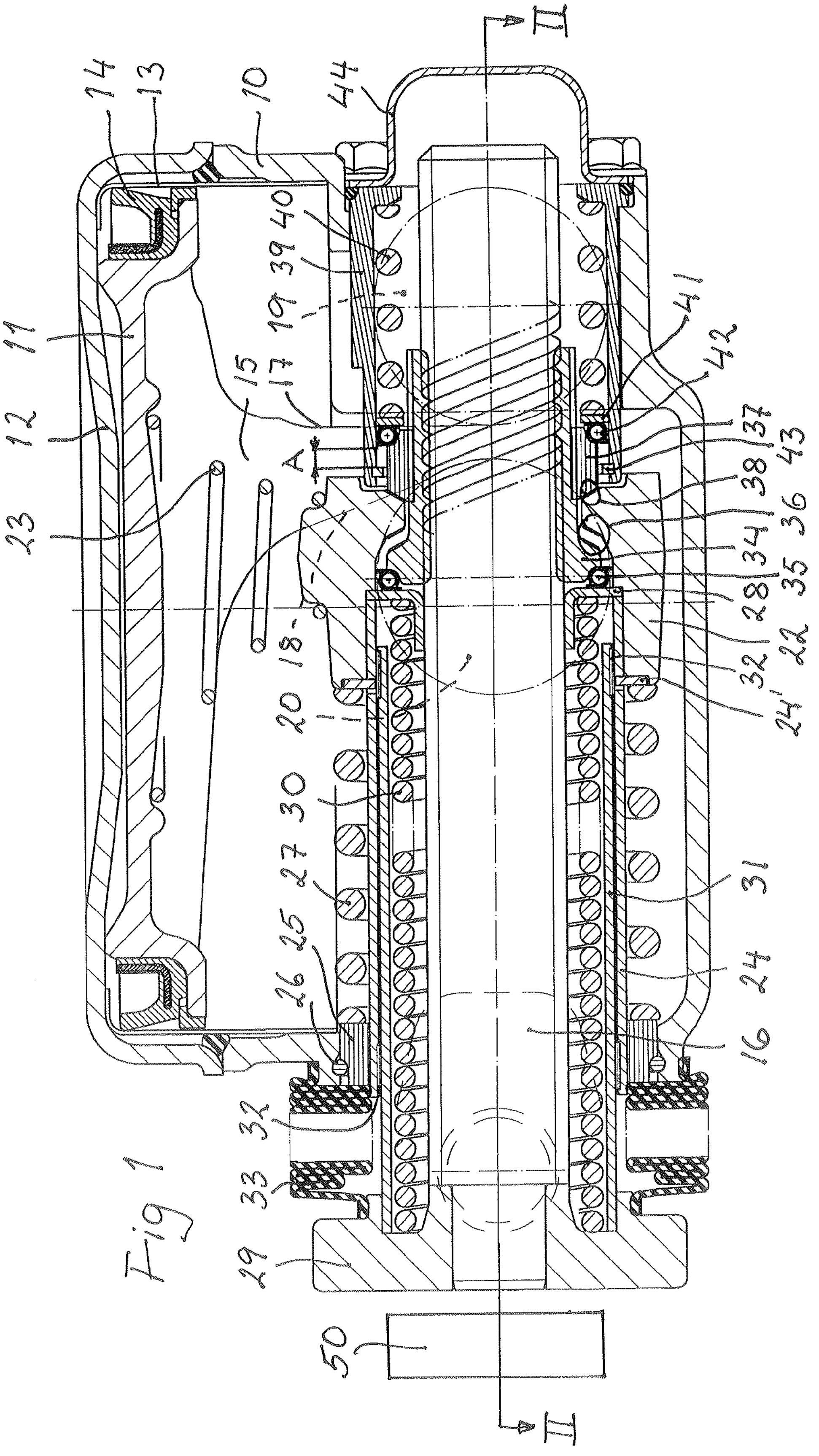
FIG. 1 is a sectional side view of a brake unit with a slack adjuster according to the present invention.
Figure 2:
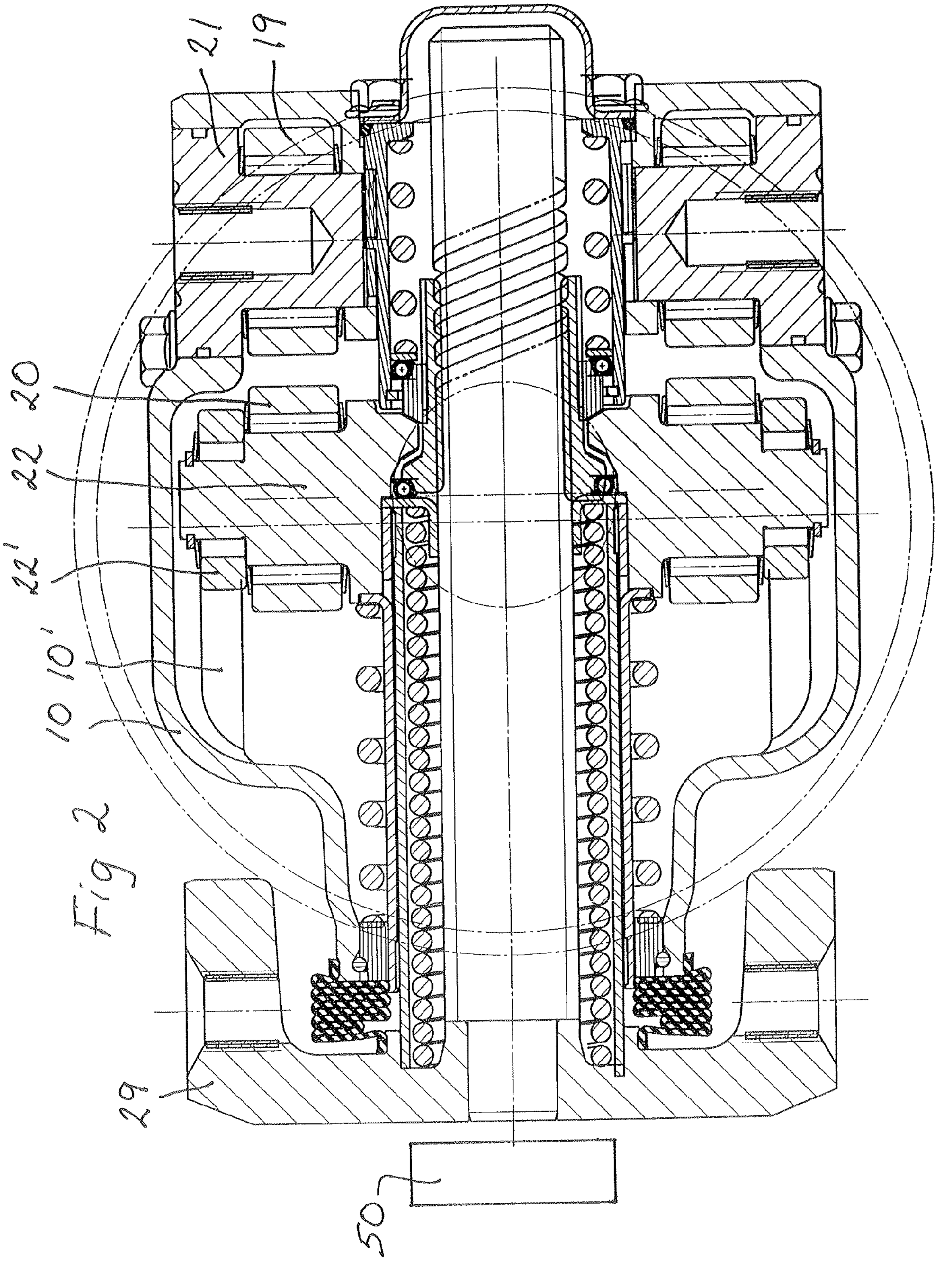
FIG. 2 is a section along the line II-II in FIG. 1, and FIGS. 3*a* and 3*b* somewhat overlappingly and in a view corresponding to FIG. 1 together show a slightly modified embodiment of a brake unit with a slack adjuster according to the invention.

A brake unit for a rail vehicle is shown in section in FIGS. 1 and 2. A brake unit generally comprises a brake cylinder (or a similar brake actuating means) and a slack adjuster built into a common housing.

FIG. 1 is provided with all possible reference numerals, whereas such numerals are more sparsely used in FIG. 2 for clarity reasons. When used in this specification, terms like "vertical", "horizontal", "below" and "above" are used with reference to the position of the brake unit on the drawings, even if the brake unit when mounted on a rail vehicle may well have other positions.

The brake unit has a housing 10, which is cylinder-shaped in its upper end. A piston 11 is vertically movably arranged in this cylinder-shaped upper part of the housing 10. A cover 12 above the piston 11 is screwed to the housing 10. A cylinder liner 13 may be arranged, and the piston 11 can be provided with a conventional piston sealing 14.

At its underside the piston 11 is provided with two generally vertical wedge elements 15 (only shown in FIG. 1). When compressed air is admitted to the space above the piston 11, pushing it down into its cylinder, the wedge elements 15 will transmit a force to further parts of the brake unit, as will be described below. More specifically, the force is transferred from a force in the vertical direction in the drawing generally perpendicularly into a force in a horizontal direction to the left in the drawing in a push rod represented by a spindle 16 of a slack adjuster to be described.

Each wedge element 15 has a reaction surface 17 parallel with the axis of the piston 11 and a wedge surface 18 inclined relative thereto. The wedge elements 15 extend between rollers 19 and 20 in the housing 10 and in a force transmitting chain to the spindle 16, respectively, as will appear.

Housing rollers or reaction rollers 19 are journalled on stub axles 21 inserted in the housing. Working rollers 20 are journalled on a generally sleeve-shaped driver element 22, force-transmittingly connected to the spindle 16 in a way to be described.

The driver element 22 is supported or guided by the housing 10 by being provided outside each working roller 20 with a rotatable support roller 22' in engagement with a support plane 10' in the housing 10.

It appears that when the piston 11 is pushed down under the force from compressed air, the working rollers 20 and thus the spindle 16 will be pushed to the left in the drawings by the wedge elements 15.

A piston spring 23 of compression-type is arranged between the driver element 22 and the piston 11 for applying a return force to the latter.

A driver element sleeve 24 extends to the left or forwards from the driver element 22. It has stamped-out tabs 24' in engagement with a left hand or forward end of the driver element 22. The driver element sleeve 24 is slidingly guided by a guiding bushing 25, which is held in place in the housing 10 by means of a locking ring 26. A return spring 27 of the compression-type is arranged to act between the guiding bushing 25 (and thus the housing 10) and the tabs 24' (and thus the driver element 22). A guiding sleeve 28 is arranged to guide the spindle 16 in relation to the driver element 22.

At its forward end or the end to the left in the drawings, the push rod or spindle 16 is attached to a push member 29 for connection to a suitable member of a brake rigging of a rail vehicle, on which the brake unit is mounted. Hereby, the spindle 16 is non-rotatable. A barrel spring 30 of compression-type is arranged between the guiding sleeve 28 (and thus the driver element 22) and the push member 29.

A barrel spring sleeve 31 is connected to the push member 29 and surrounds the barrel spring 30. It is slidingly guided by the driver element sleeve 24 via slide rings 32.

A rubber bellows 33 is arranged between the housing 10 and the push member 29 in order to prevent the intrusion of moist, dirt and the like into the brake unit.

An adjuster nut 34 is positioned generally inside the driver element 22 and is in non-self-locking thread engagement with the spindle 16. At its forward end or left hand end, it is provided with a ball bearing 35 for engagement with the guiding sleeve 28.

The adjuster nut 34 has a rearwardly directed, conical clutch surface for cooperation with a forwardly directed, conical clutch surface of the driver element 22, the two surfaces forming a first clutch 36.

An adjuster nut sleeve 37 is axially movably arranged on the adjuster nut 34. A second clutch 38 is formed by a rearwardly directed, conical clutch surface on the driver element 22 and a forwardly directed, conical clutch surface on the adjuster nut sleeve 37.

The possibility of the adjuster nut sleeve 37 to move to the left in FIGS. 1 and 2 or forwards in relation to the adjuster nut 34 is limited by an adjuster shoulder, so that only one of the two clutches 36 and 38 can be engaged at a time.

A control sleeve 39 is fixedly arranged in the rear part of the housing 10 coaxially with the spindle 16. It contains a leader spring 40 of compression type acting forwardly or to the left in the drawings on the adjuster nut sleeve 37 via a washer 41 and a ball bearing 42. The control sleeve 39 contains an internal locking ring 43, against which the ball bearing 42 can come to rest at a forward movement under the action of the leader spring 40. The distance between the ball bearing 42 and the locking ring 43 in a rest position constitutes the control distance or "A"-measure for the described slack adjuster in the brake unit.

The end of the housing 10 over the control sleeve 39 is provided with a cover 44.

In a rest position or neutral position, shown in FIGS. 1 and 2, the second clutch 38 is held engaged by the leader spring 40 (whereas the first clutch 36 is disengaged), so that the adjuster nut 34 is rotationally locked in its position on the spindle 16.

The function of the brake unit shown in FIGS. 1 and 2, especially its slack adjuster or brake regulator, will now be described. Although the brake unit can be used either for block braking or disc braking, the design of the push member 29 is appropriate for use in a disc brake rigging. The push member 29 is then to be non-rotatably connected to a part of a disc brake caliper comprising a brake pad for braking engagement with a brake disc of the rail vehicle, on which the arrangement is mounted, as is well known to any person skilled in the art.

For simplifying the description, however, it will be assumed that the push member 29 is the braking component to be brought into engagement with the element to be braked (the brake disc). This element, indicated in FIGS. 1 and 2, will be called a brake disc 50.

It has already been described that the driver element 22 will move to the left in FIGS. 1 and 2 for brake application, when compressed air is admitted above the piston 11.

It will appear that the slack adjuster of the brake unit is of the double-acting type, i. e. it will compensate both for an excessive slack and an insufficient slack. The function description will be divided into the three possibilities: correct slack, excessive slack and insufficient slack.

Correct Slack

In this situation the distance at rest between the push member 29 and the brake disc 50 corresponds to the control distance A between the ball bearing 42 and the locking ring 43.

At the first portion of a brake application, the driver element 22 moves to the left in FIGS. 1 and 2 (with all slack adjuster members in their mutual positions shown in FIGS. 1 and 2), until the push member 29 gets in contact with the brake disc 50.

When the push member 29 gets in contact with the disc 50, the driver element 22 leaves its engagement with the adjuster nut sleeve 37 (by the second clutch 38) and immediately enters into engagement with the adjuster nut 34 (by the first clutch 36), so that the adjuster nut 34 continues to be locked in relation to the spindle 16 and the continued brake application in the so called elasticity range occurs with all slack adjuster members in their mutual positions shown in FIGS. 1 and 2.

During the release stroke under the action of the piston spring 23 and the return spring 27, the function is the reverse, and the adjuster nut 34 is held stationary in relation to the spindle 16.

Excessive Slack

In this case the distance between the push member 29 and the brake disc 50 exceeds the control distance A in the slack adjuster (in most cases depending on wear of brake pads in the brake rigging).

At the first phase of the brake application the push member 29 has not reached the brake disc 50, when the A-measure has been consumed and the ball bearing 42 has reached the locking ring 43. The second clutch 38 is disengaged, so that the adjuster nut 34 is free to rotate on the spindle 16. The spindle 16 and the push member 29 are now free to move to the left in the drawings under the action of the barrel spring 30, until the push member 29 contacts the brake disc 50 and the first clutch 36 is engaged, preventing any further rotation of the adjuster nut 34 on the spindle 16.

The continued brake application during the elasticity stroke and the brake release occur as previously described.

Insufficient Slack

If the slack is insufficient, i. e. the push member 29 reaches the brake disc 50 before the A-measure is consumed or in other words before the ball bearing 42 has reached the locking ring 43, which for example may happen after the replacement of a worn out brake pad in the disc brake rigging, the following sequence will occur:

When the push member 29 has reached the brake disc 50 and the driver element 22 continues forward, the second clutch 38 will open, so that the adjuster nut 34 will be free to rotate and the spindle 16 may be pushed back in relation to the driver element 22.

At the continued application the driver element 22 will get in contact with the adjuster nut 34, so that the first clutch 36 is closed and the operation described above for the elasticity stroke and the release stroke is repeated.

Replacement of Worn-Out Brake Pads

When the spindle 16 has been extended out of the brake unit after slack adjusting depending on brake pad wear, the shown and described design of the slack adjuster in the brake unit will make it possible to simply push back the spindle 16 into the brake unit. When a push force to the right in the drawings is applied on the spindle 16 via the push member 29, the second clutch 38 will be disengaged, so that rotation of the adjuster nut 34 is enabled. When the spindle 16 has been manually brought back, replacement of worn-out brake pads will be possible.

MODIFICATIONS

Many modifications are possible within the scope of the appended claims.

Figure 3A:
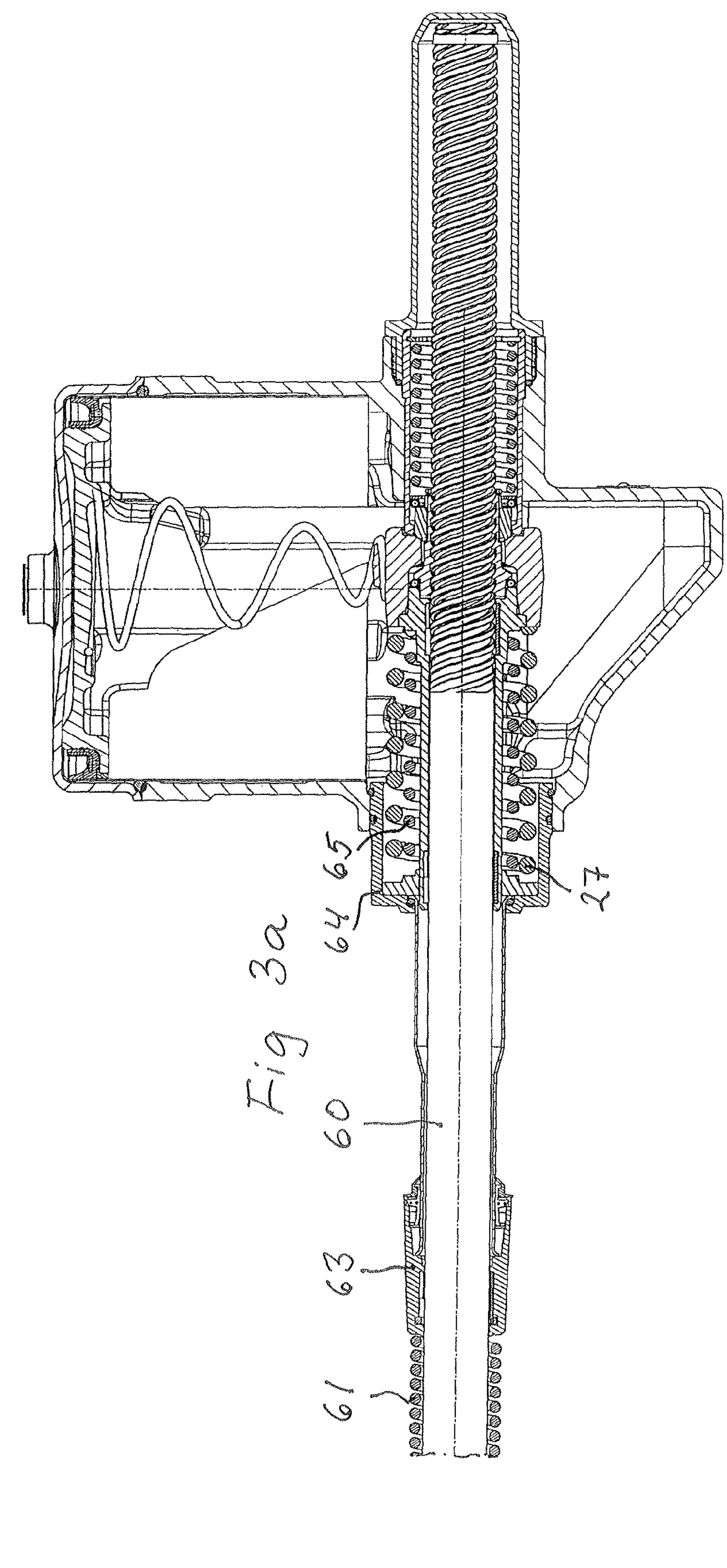
Figure 3B:
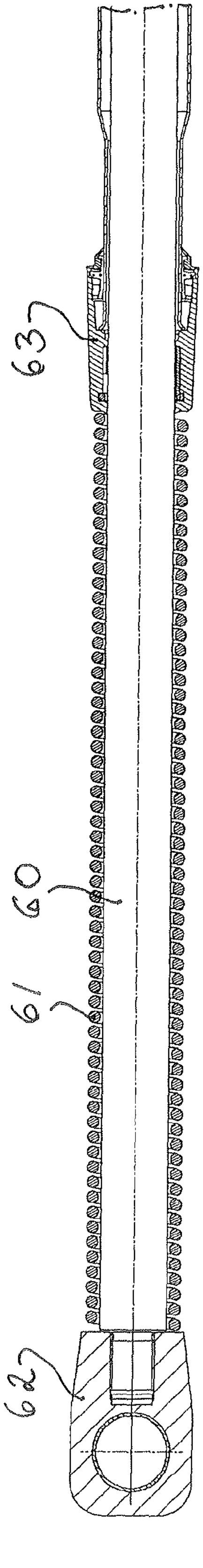

One such modification is shown in FIGS. 3*a* and 3*b*, which together show a slightly different brake unit with a slack adjuster according to the invention. For the sake of clarity and convenience, FIGS. 3*a* and 3*b* are only provided with reference numerals to the extent necessary for a proper understanding of the modification.

This brake unit is primarily intended for use in a so-called rail vehicle bogie brake, where the brake unit itself is placed in a first brake beam and is connected with its push rod to a second brake beam. Each brake beam is provided at either end with a brake block for braking engagement with a tread of a wheel in the bogie.

In this application the brake unit and its spindle 60 or push rod must have substantially longer strokes, which appears very clearly at a comparison between FIG. 1 and FIGS. 3*a* and 3*b*. This means that the barrel spring 61 must be longer and stronger in order to be able to fulfill its intended purpose to push the push member 62 forward or to the left in the drawing in a certain operation sequence, especially as the operation range is much longer.

Space requirements also necessitates another location for the barrel spring 61 than in the brake unit housing, namely around the forward or left hand end of the extended push rod 60 with its left end supported by the push member 62 and its right end supported by a sealing sleeve 63.

For the sake of convenience this sealing sleeve 63 is here regarded as one member but has in reality a rather intricate sealing design and consists of several parts. Its right end is attached to a housing cup 64, which supports the previously described return spring 27 but also a balancing spring 65 for balancing the added force of the barrel spring 61.

The invention claimed is:

1. A rail vehicle brake slack adjuster, comprising an axially movable, sleeve-shaped driver element adapted to receive an axially applied braking force in a brake application direction, a spindle axially movable within the driver element, an adjuster nut in non-self-locking thread engagement with the spindle, clutch means between the driver element and the adjuster nut, and a barrel spring biasing the spindle in the brake application direction, wherein the combination of a first clutch comprising a clutch surface on the driver element directed in the brake application direction and a corresponding clutch surface on the adjuster nut and a second clutch comprising a clutch surface on the driver element directed in the direction opposite to the brake application direction and a corresponding clutch surface on an adjuster nut sleeve, the adjuster nut sleeve a) being axially movable on the adjuster nut and, b) being biased in the brake application direction by a leader spring and, c) having an end position in the brake application direction in relation to the adjuster nut such that the minimum axial distance between the clutch surfaces on the adjuster nut and the adjuster nut sleeve exceeds the axial distance between the two clutch surfaces on the driver element, and d) defining a control distance or "A"-measure with a control sleeve, which is axially fixed in relation to the driver sleeve and the adjuster nut.

2. A slack adjuster according to claim 1, wherein the leader spring bears against the adjuster nut sleeve via a ball bearing, which defines the control distance or "A"-measure with an internal locking ring in the control sleeve.

3. A slack adjuster according to claim 1, wherein an axially movable driver element sleeve, attached to the driver element, is slidingly guided by a housing for the slack adjuster and an axially movable barrel spring sleeve, connected to a push member at the end of the spindle, is slidingly guided by the driver element sleeve, the barrel spring being arranged within these two sleeves.

4. A slack adjuster according to claim 3, wherein a guiding sleeve for the spindle is attached to the driver element.

5. A slack adjuster according to claim 4, wherein a ball bearing is arranged between the guiding sleeve and the adjuster nut.

6. A slack adjuster according to claim 1, wherein the two clutches are serrated.

7. A slack adjuster according to claim 1, wherein the barrel spring is arranged around the spindle between a push member at the end of the spindle and a sealing sleeve forming a part of the housing for the slack adjuster.

8. A slack adjuster according to claim 1, wherein the slack adjuster forms part of and is built-into a brake unit, in which the driver element is transferred in the brake application direction by a piston.

* * * * *